United States Patent [19]

Ito

[11] Patent Number: 5,084,759
[45] Date of Patent: Jan. 28, 1992

[54] IMAGE OUTPUTTING APPARATUS

[75] Inventor: Yousuke Ito, Nagoya, Japan

[73] Assignee: Brother Kogyo Kabushiki Kaisha, Japan

[21] Appl. No.: 546,105

[22] Filed: Jun. 29, 1990

[30] Foreign Application Priority Data

Aug. 7, 1989 [JP] Japan .................. 1-204427

[51] Int. Cl.$^5$ .................. H04N 1/23; H04N 1/21
[52] U.S. Cl. .................. 358/298; 358/455; 358/460
[58] Field of Search .................. 346/76 PH; 358/298, 358/456, 457, 455, 460

[56] References Cited

U.S. PATENT DOCUMENTS

| | | | |
|---|---|---|---|
| 4,495,522 | 1/1985 | Matsunawa et al. | 358/457 |
| 4,673,951 | 6/1987 | Mutoh et al. | 358/298 |
| 4,847,662 | 7/1989 | Yamada. | |
| 4,851,861 | 7/1989 | Kikuchi et al. | 346/76 PH |
| 4,890,120 | 12/1989 | Sasaki et al. | 346/76 PH |

*Primary Examiner*—Benjamin R. Fuller
*Assistant Examiner*—Scott A. Rogers
*Attorney, Agent, or Firm*—Oliff & Berridge

[57] ABSTRACT

An image outputting apparatus divides an image to be outputted into a plurality of pixels and delivers the image, with a pixel-wise concentration being modulated in multiple levels, to the output means. The image outputting apparatus includes output mode storage means which stores output modes for outputting the image in different numbers of levels of concentration equal to and less than the maximum number of levels of concentration applicable to each pixel. The image recording apparatus is capable of outputting an image in a selected number of levels of concentration equal to or below the maximum number of levels of concentration applicable to each pixel, and by selecting a proper output mode to meet the intention, a plurality of kinds of images which render different impressions can be produced.

11 Claims, 3 Drawing Sheets

IMAGE OUTPUTTING APPARATUS

BACKGROUND OF THE INVENTION

1. Field of the Invention

The present invention relates to an image outputting apparatus, and particularly to the technique of displaying images in multi-level tones.

2. Description of the Related Art

Among image outputting apparatus, one type of apparatus can vary the concentration of color in multiple levels for each unit output area, and the other type of apparatus can vary the concentration only in two levels. In case the output image needs to be toned in colors as in a landscape or portrait, rather than a literal text, the former type of apparatus outputs the image with a concentration substantially the same as the original image for each unit output area selected suitably from available multi-level concentrations, and the latter type of apparatus outputs the image based on the area toning method. The area toning method expresses a tone in terms of the number of output units to be colored within a matrix assumed to be constructed from m×n output units. The former type of apparatus can produce an image of high resolution with precise toning. The latter type of apparatus establishes a tone for each area made up of multiple unit output areas and, although the resolution is low, it features to produce design-oriented images and images with the emergence of a moire pattern.

In the conventional apparatus having output means for outputting an image by varying the concentration of unit output areas in multiple levels, when it is needed to output an image in toned colors, a number of types of outputs are produced only with concentrations of the maximum number of levels available by the apparatus and an output in a smaller number of levels is not produced.

SUMMARY OF THE INVENTION

An object of the present invention is to provide an image outputting apparatus capable of outputting multi-level concentrations for each unit output area, wherein the apparatus is also capable of outputting an image with concentrations of different numbers of levels.

In order to achieve the above object, the invention resides, in one aspect, in an image outputting apparatus having output means for implementing an image output by varying the concentration of unit output areas in multiple levels, wherein the apparatus is characterized in comprising: (a) output mode storage means which stores a plurality of output modes in which an image is outputted in different numbers of levels of concentration equal to and less than a maximum number of levels of concentration available, and (b) output control means which operates on the output means to output the image in an output mode selected from among the output modes stored in the output mode storage means.

The image outputting apparatus in the present invention includes apparatus for recording an image on a recording medium, such as printers, as well as apparatus for displaying an image on a CRT screen.

Image output in the maximum number of levels of concentration available can produce a high quality output image with precise toning, while it is also possible to produce different output images in correspondence to reduced numbers of levels of concentration, although the precision of toning falls. Accordingly, by storing output modes of different numbers of levels of concentration, output images which render different impressions can be produced. For example, by storing the area toning mode of 2-level concentration, which is the minimum number of levels, it becomes possible to take the advantage of 2-level toning for producing a design-oriented image and an image with the effect of a moire pattern.

According to the image outputting apparatus of this invention, in an output apparatus capable of varying the concentration in multiple levels for each output unit area, an image can be outputted in concentration at a number of levels less than the maximum number of levels, whereby many kinds of images rendering different impressions can be produced by selecting proper output modes according to intended purposes.

These and other objects and novel features of the present invention will become more apparent from the following detailed description taken in conjunction with the accompanying drawings. The drawings are for illustrative purposes, and the invention is not limited to the embodiments shown therein.

BRIEF DESCRIPTION OF THE DRAWINGS

Among the accompanying drawings.

DESCRIPTION OF THE PREFERRED EMBODIMENT

The present invention will be described in detail by taking as an example, application of the invention to a thermal sublimation image recording apparatus, with reference to the drawings.

Figure 2:
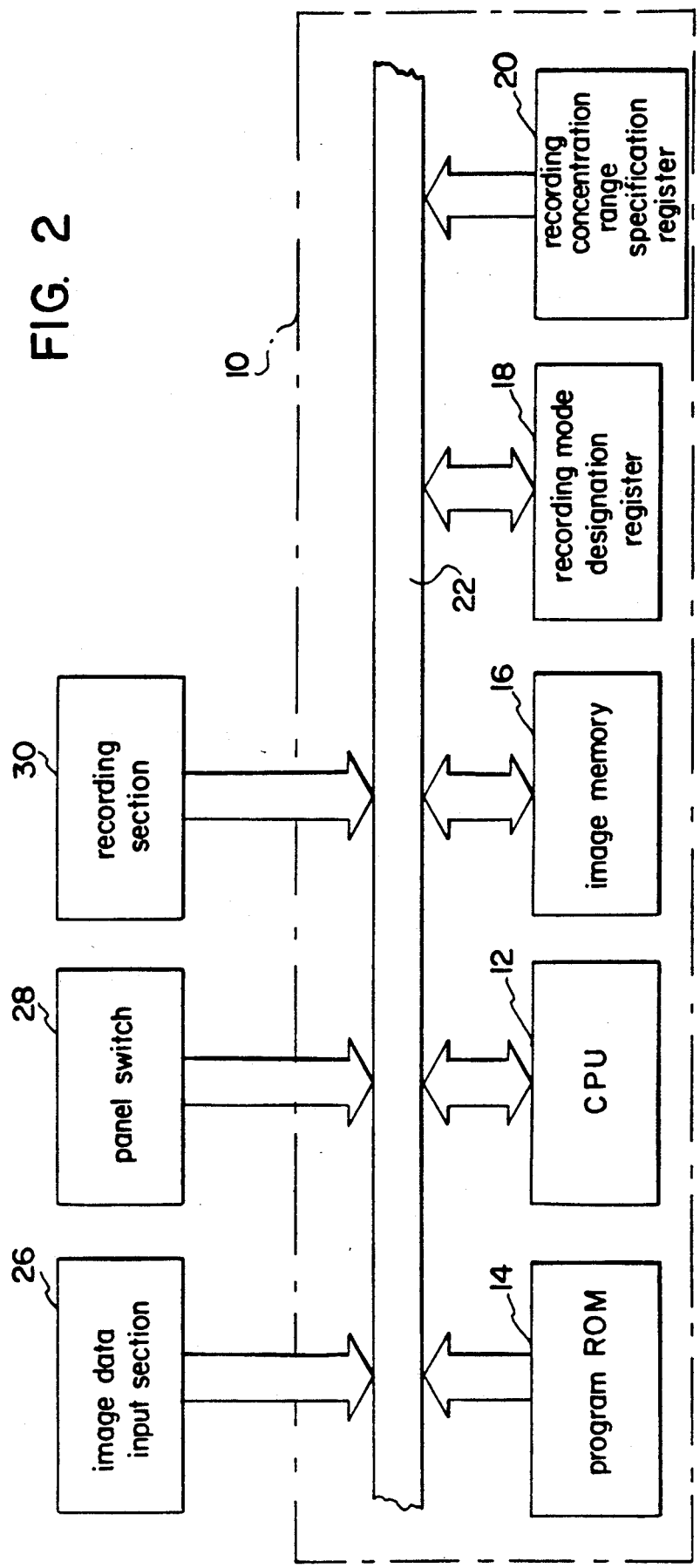
FIG. 2 is a block diagram showing the arrangement of a control circuit of the image outputting apparatus embodying the present invention.

FIG. 2 is a diagram showing the control circuit of the image recording apparatus. The control circuit is principally formed of a microcomputer section 10, which includes a CPU 12, a program ROM 14, an image memory 16, a recording mode designation register 18, and a recording concentration range specification register 20. These components are interconnected by a bus 22, which is also connected with an image data input section 26, a panel switch 28 and a recording section 30.

This image recording apparatus is designed to record an image on a thermal sublimation recording paper. The thermal sublimation recording paper contains ink which sublimates by being heated, and the recording process is conducted by supplying an electrical current to heating elements disposed in the recording section 30 so as to heat the recording paper thereby to sublimate the ink. A piece of the heating element sublimates ink in an area which determines a unit output area ("pixel" hereinafter). By providing a relative movement between a recording paper and a recording head having a plurality of heating elements, an image is recorded on the recording paper. A variation in the amount of supply current to the heating elements results in a variation in the amount of sublimation and thus in the variation in the coloring concentration. This embodiment of the invention is designed to produce the concentration in 256 levels.

The heating elements heat the recording paper in accordance with image data. The image data stored in an external storage unit (not shown) includes the degree of heating, i.e., data indicative of the concentration, and it is introduced through the image data input section 26 when recording.

Figure 4:
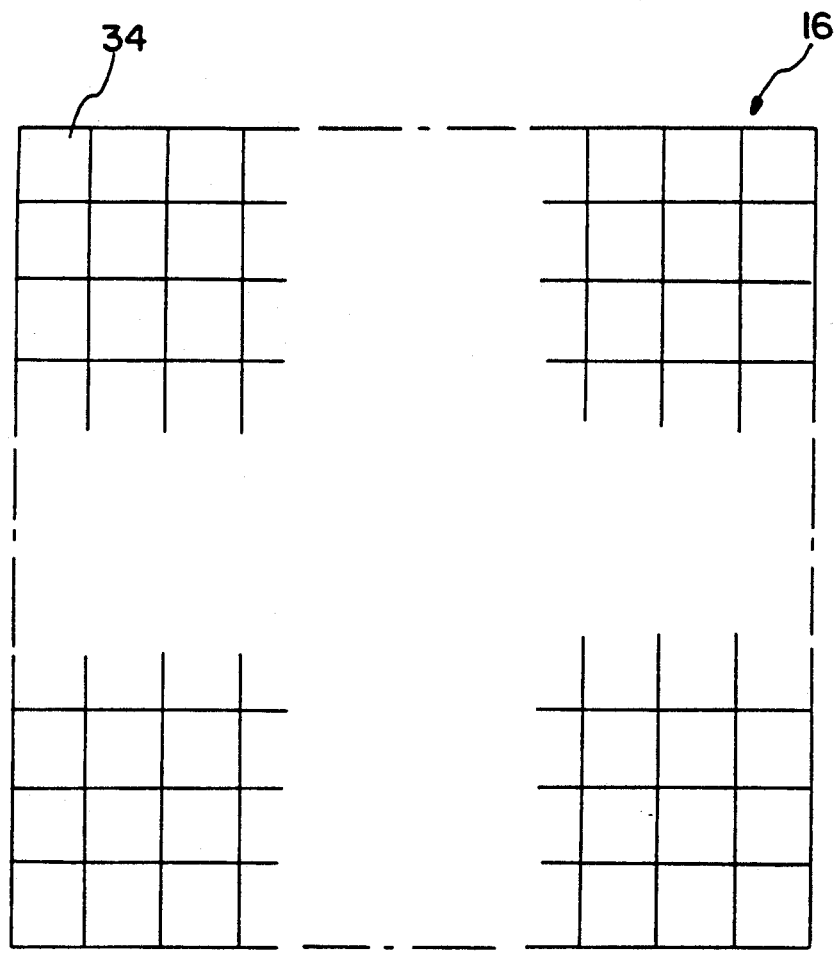
FIG. 4 is a diagram showing an arrangement of the image memory.

The image memory 16 is used during recording for temporarily storing the image data which has been entered through the image data input section 26, and it consists of a plurality of pixel memories 34 as shown in FIG. 4. The pixel memories 34 are provided in one-to-one correspondence to pixels for recording a complete page, and each memory 34 has a capacity of eight bits. The recording mode designation register 18 stores data which designates a recording mode. This image recording apparatus has a recording mode of 256 concentration levels for each pixel and another recording mode of two concentration levels, as will be explained later in connection with the program stored in the program ROM 14, and one of the recording modes is selected by the data stored in the register 18. The recording concentration range specification register 20 stores data for specifying concentrations which can be stored in the image memory 16. The 8-bit pixel memory 34 of this image recording apparatus can store 256 kinds of concentration specification data, and data indicative of this attribution is stored in the recording concentration range specification register 20. Data is set in the recording mode designation register 18 by means of the panel switch 28.

Figure 3:
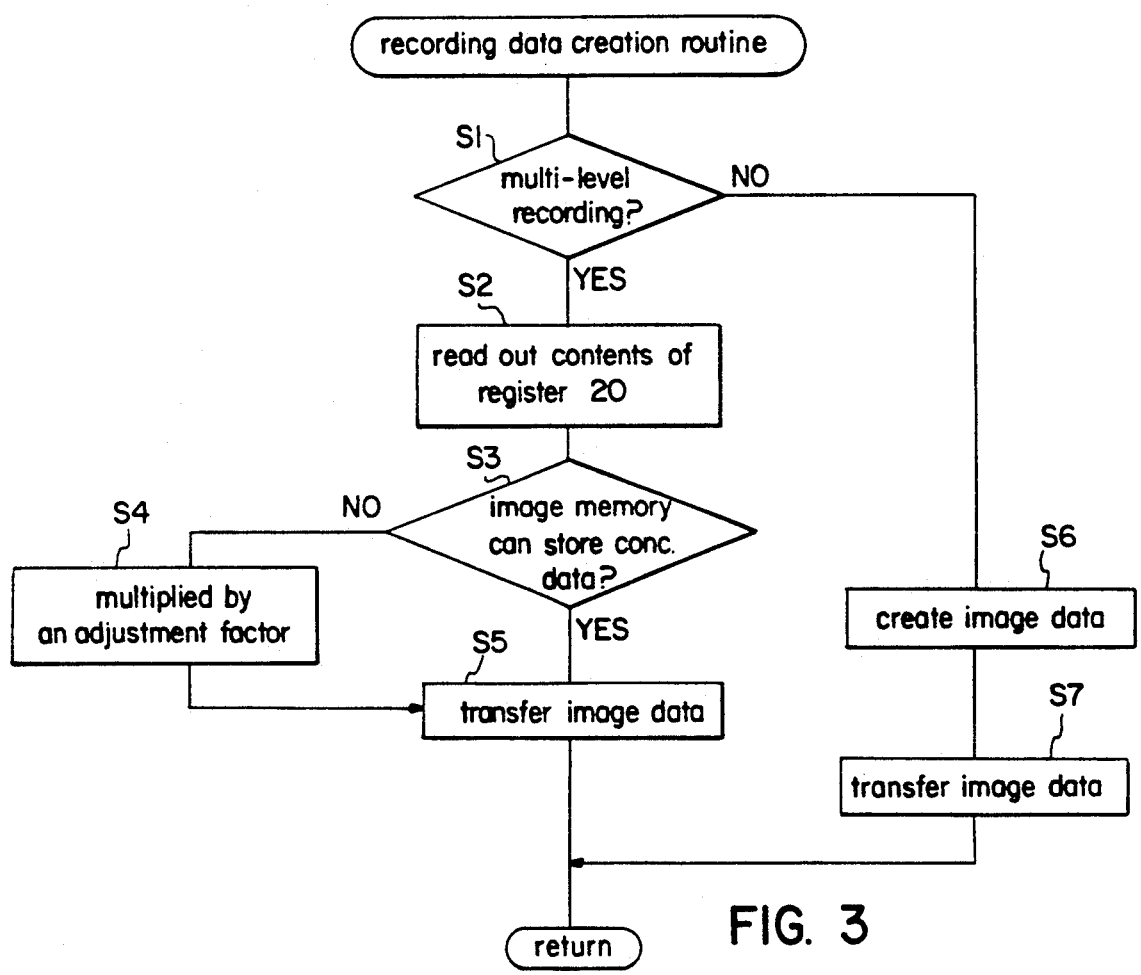
FIG. 3 is a flowchart showing a recording data creation program stored in the program ROM of the control circuit.

The program ROM 14 stores a recording data creation program as shown by the flowchart of FIG. 3. Prior to recording, the operator enters a recording mode using the panel switch 28. With image data being entered through the input section 26, step S1 of the program is executed, and the contents of the recording mode designation register 18 is read out to judge whether or not the recording mode is multi-level recording in which each pixel is recorded in one of 256-level concentrations. The selection of multi-level recording results in a judgment of YES, and, the contents of the recording concentration range specification register 20 is read out in S2. In S3 it is judged whether or not the image memory 16 can store the concentration data specified by the image data. Concentration data of image data inputted from the image data input section 26 is not necessarily in the range that the apparatus can output. For example, image data may be inputted from a host computer specifying concentration in more than 256 levels, thus exceeding the capacity of pixel memory 34. In case the capacity of the pixel memory 34 does not allow storage of the concentration data, the concentration data is multiplied by an adjustment factor (S4) and the modified data is transferred to the image memory 16 (S5). In this case, the number of levels of concentration is reduced to 256. Calculation of the multiplication factor is explained by way of an example, wherein the concentration data of inputted image data is specified in 512 levels (corresponding to 9 bits). In this case, an adjusted concentration value for each pixel is obtained by multiplying the specified level by the factor (256/512). Thus, a pixel having a maximum concentration originally specified as 512 is adjusted to 256 and so forth. After the image data has been transferred, the image recording routine (not shown) waits for the recording start command, and upon receiving the command the recording data is transferred from the image memory 16 to the recording section 30 and the image is recorded in multi-level concentration.

In another case where recording in 2-level concentrations for each pixel is selected, the step S1 produces a result of NO, and image data based on the known dither method is created in step S6. In the dither method, an image is divided into numerous matrixes each made up of m×n pixels, and pixels to be colored in a divisional matrix are determined on the basis of comparison between the divisional matrix and a predetermined matrix with threshold values. Data created in this manner is transferred to the image memory 16 in step S7. When the commencement of recording is instructed, the image is recorded in accordance with the recording data stored in the image memory 16. Although the resolution of the recorded image is low, a design-oriented image with the presence of color pixels and the emergence of a moire pattern is produced satisfactorily.

Figure 1:
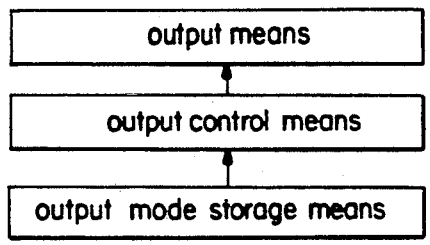
FIG. 1 is a block diagram showing conceptually the arrangement of an apparatus of this invention.

According to the embodiment of this invention, as is obvious from the above explanation, referring to FIG. 1, the output means is constituted by the recording section 30, the output mode storage means is constituted by the section of the program ROM 14 which stores the steps S1-S7 and the section of the CPU 12 which executes these steps, and the output control means is constituted by the section of the program ROM 14 which stores the recording program for the recording section 30 and the section of the CPU 12 which executes the program.

Although in the foregoing embodiment the image output is based on the multi-level concentration with the maximum number of levels or 2-level concentration selectively, modification may be made such that the number of concentration levels is smaller than the maximum number of levels and larger than two levels.

The toning method based on the area toning method may also be a known dot pattern method in which m×n matrix threshold values are allotted to each pixel (unit area) of the original image, or a known conditional dither method which uses a plurality of pixel information for determining the activation or deactivation of each pixel of the original image with the intention of introducing the influence of surrounding pixels on each pixel. These methods produce output images with different appearances. The apparatus may also be designed such that a plurality of modes of 2-level recording (e.g., both the dither method and dot pattern method) are stored and any of the modes is selected for recording.

Moreover, although in the foregoing embodiment the recording paper contains ink, the present invention is also applicable to other image recording apparatus capable of varying the concentration of output unit area in multiple levels, such as an image recording apparatus which operates to sublimate the sublimative ink by heating and transferring it to the recording paper.

While the present invention has been described and shown in terms of a specific embodiment, it will be obvious to those skilled in the art that changes and modifications may be made without departing from the invention in its broader aspects.

What is claimed is:

1. An image outputting apparatus for outputting an image divided into a plurality of unit output areas, comprising:
   a means for setting image concentration data, the image concentration data comprising:

one concentration level from a plurality of concentration levels for each of the plurality of unit output areas;

an output means for outputting the image concentration data of each unit output area to form the image;

an output mode storage means for storing a plurality of output modes, each mode having different pluralities of concentration levels;

an output mode setting means for setting an output mode comprising a maximum integral number of concentration levels in a continuously variable range of allowable numbers of concentration levels from two concentration levels to a maximum total number of concentration levels;

an output control means for controlling the output means comprising:

a means for setting a maximum total number of concentration levels; and a means for processing the image concentration data based on an output mode set by the output mode setting means.

2. An image outputting apparatus according to claim 1, wherein the setting means comprises a panel switch.

3. An image outputting apparatus according to claim 1, wherein one of the output modes is a toning mode toned by two concentration levels only.

4. An image outputting apparatus according to claim 3, wherein the toning mode is conducted by a dither method.

5. An image outputting apparatus according to claim 3, wherein the toning mode is conducted by a dot pattern method.

6. An image outputting apparatus according to claim 3, wherein the toning mode includes the dither method and the dot pattern method and the output control means controls the output means so as to output the image based on one of the methods when the toning mode is selected.

7. An image outputting apparatus according to claim 1, wherein the output means includes a recording sheet coated with sublimation ink and a heating element and wherein the output control means controls the output means so as to output the image in multiple concentration levels by changing a degree of heating in the heating element.

8. An image outputting apparatus according to claim 1, wherein the output control means further comprises:

an image memory for storing concentration data of the image in multiple concentration levels for each unit output area;

a means for judging whether or not the image memory is capable of storing the concentration data represented in multiple concentration levels;

a means for processing the concentration data so as to be stored in the image memory based on a result judged by the judging means.

9. An image outputting apparatus according to claim 8, wherein the processing means changes the concentration data to enable it to be stored in the image memory when the judging means judges that the image memory is not capable of storing the concentration data.

10. An image outputting apparatus according to claim 9, wherein the processing means changes the concentration data by multiplying the concentration data by an adjustment factor.

11. An image outputting apparatus having output means for outputting an image by varying the concentration level of a plurality of unit output areas chosen from a plurality of concentration levels, wherein the apparatus comprises:

output mode storage means for storing a plurality of different output modes, wherein each output mode is capable of outputting an image in any maximum integral number of concentration levels equal to and less than a maximum number of concentration levels; and output control means which operates on the output means to output the image in an output mode selected from the plurality of output modes stored in the output mode storage means.

* * * * *